Aug. 20, 1957  W. NORDSIECK  2,803,511
CONNECTING DEVICES FOR CABINETS
Filed Aug. 29, 1955  2 Sheets-Sheet 1
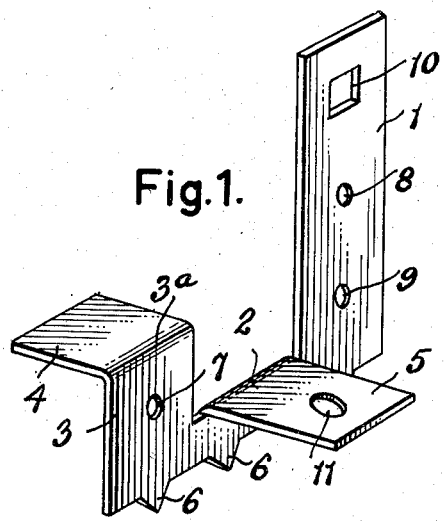
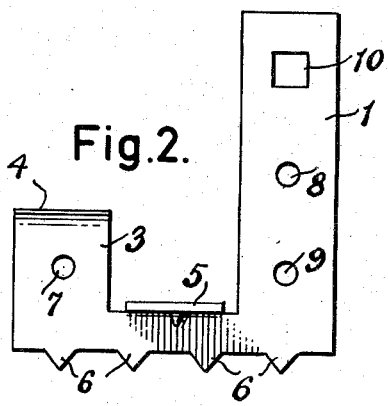
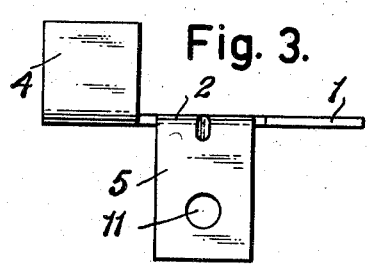
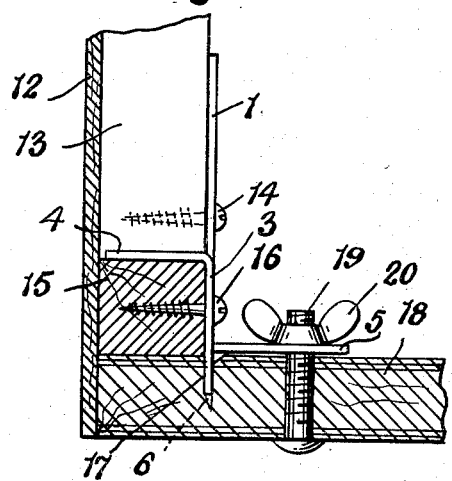
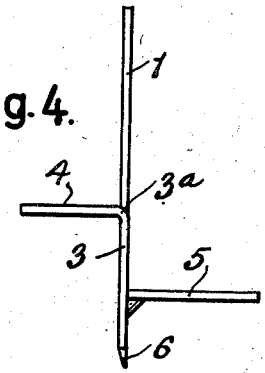
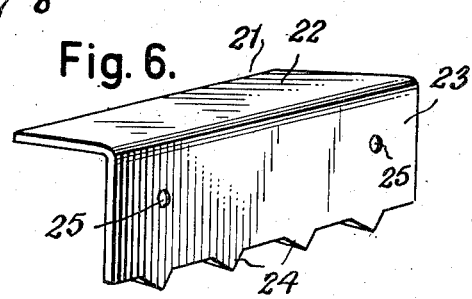
INVENTOR.
William Nordsieck
BY
Harry Radzinsky
Attorney

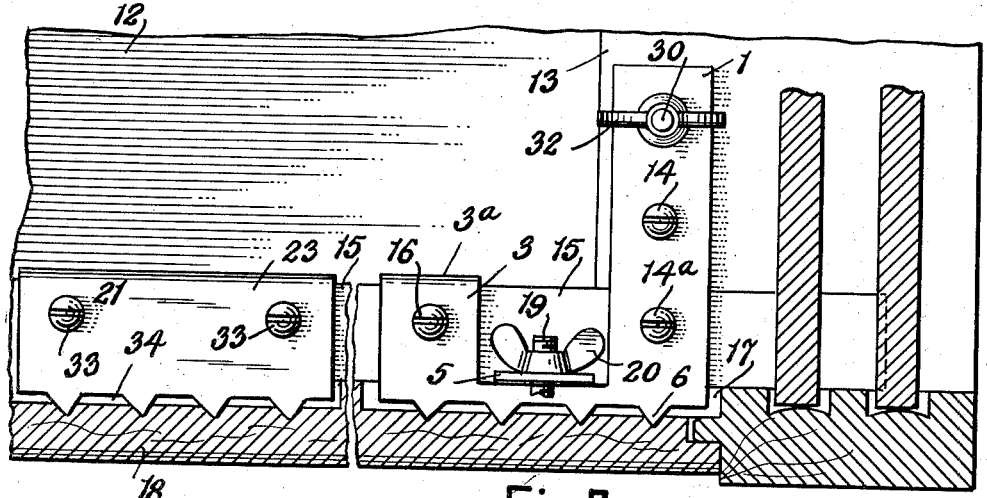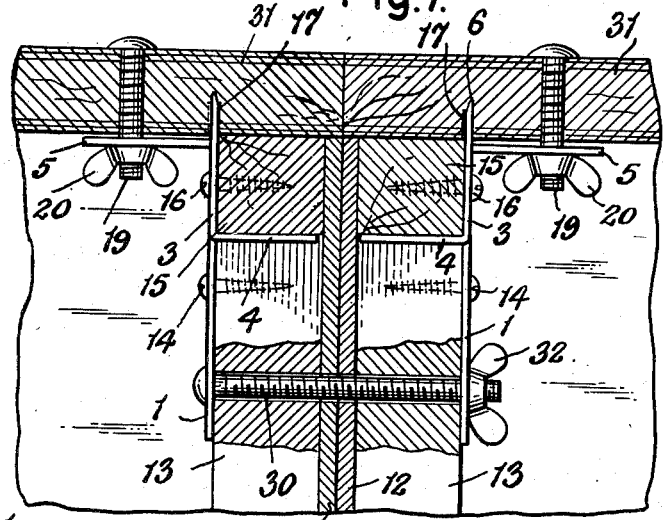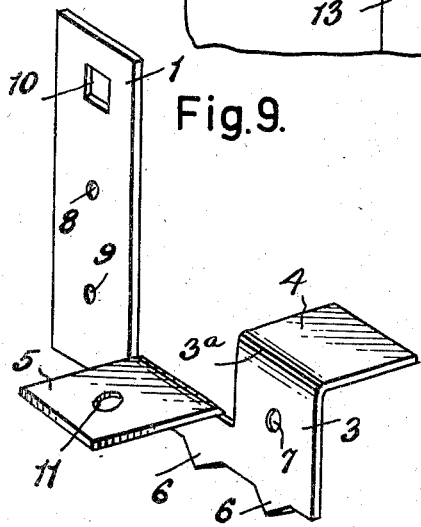

United States Patent Office 2,803,511
Patented Aug. 20, 1957

2,803,511

CONNECTING DEVICES FOR CABINETS

William Nordsieck, New York, N. Y., assignor to Eastern Cabinet Company, Inc., New York, N. Y., a corporation of New York Application August 29, 1955, Serial No. 531,114

6 Claims. (Cl. 312—263)

This invention relates to connecting devices for display cabinets, for show cases, boxes of various kinds, or for other articles, and particularly for structures which are largely, or perhaps wholly, composed of wood.

It is an object of the invention to provide devices for joining or connecting together the walls, tops and bottoms of display cases or cabinets in a manner to result in a strong and sturdy structure.

It is another object of the invention to provide connecting means by which a display case or cabinet can be shipped or stored in flattened or knocked-down form, and which will permit of the rapid erection or assemblage of the case.

It is still another object of the invention to provide means by which a plurality of display cabinet units can be assembled and connected or coupled together in end-to-end relation or other relationship, by the utilization of the connecting devices which, in addition to coupling the case units together, will also maintain the walls and tops and bottoms of the several units together in a rigid, joined relationship.

It is still another object of the invention to provide a display case construction, and means for connecting or coupling together the parts of the case in a manner to not only permit of easy assemblage of the case or cabinet, but to also permit it to be readily dis-assembled for subsequent reassembly on other premises or in a new location. It is still another object of the invention to provide a connector which will unite panels, such as walls, tops and bottoms of the cases or enclosures in a manner to eliminate the use of permanent fastenings or gluing, and which will permit of ready dismantling of the cabinet.

With these, and other objects to be hereinafter set forth in view, I have devised the arrangement of parts to be described and more particularly pointed out in the claims appended hereto.

In the accompanying drawings, wherein an illustrative embodiment of the invention is disclosed, Fig. 1 is a perspective view of a connector constructed according to the invention;

Fig. 2 is a face or front elevational view of the same;

Fig. 3 is a top plan view of the same;

Fig. 4 is an end view of the same, looking from the left of Fig. 2;

Fig. 5 is a sectional view through the junction of a vertical wall panel and the bottom of a display cabinet, showing the application thereto of the improved connector;

Fig. 6 is a perspective view of a supplemental connector used as an accessory or adjunct to the connector of Fig. 1;

Fig. 7 is a sectional view through the bottom of a cabinet, showing the connectors applied thereto and to an end wall;

Fig. 8 is a vertical sectional view through the tops and end walls of two adjacent cabinets showing how the same are coupled or connected together by the connection devices, and Fig. 9 is a perspective view of the companion connector for that shown in Fig. 1.

Referring to the drawings, and more particularly to Fig. 1 thereof, the connection member therein shown consists of a substantially rectangular metal plate, split inwardly from one of its edges to divide it into three strip sections indicated respectively at 1, 2 and 3. One of the end strip sections, or that shown at 1, is flat and unbent and remains in the same plane as the body of the plate. The opposite end strip shown at 3, is transversely bent as indicated at 3a, at its approximate center, to thereby provide an angularly-extending, laterally projecting part 4, disposed at substantially right angles to the body of the plate.

The central strip section 2, located between the end strips 1 and 3, and herein referred to as a "lug" or "fastening lug," is bent at right angles to the body of the plate and extends in a direction opposite to the direction of extension of the laterally-projecting part 4 of the end strip section 3. The end strip 1 is formed with holes 8 and 9 for the reception of screws or other equivalent fastening elements shown at 14 and 14a in Fig. 7, and is also formed with a square opening 10 for the reception of the complementary or square part of a bolt 30 by which adjacent display cabinet units can be connected or coupled together as shown in Fig. 8.

The end strip section 3 is provided with a hole 7 for the reception of a fastening screw 16 by means of which this part of the connector is attached to a frame member or reinforcing strip 15 that is secured adjacent to one of the edges of a wall or panel 12 of the cabinet. The laterally-bent fastening lug 5 is provided with a hole 11 through which a bolt 19 is extended, and which bolt will pass through a top panel 31 or a bottom panel 18 of the cabinet in the manner shown in Fig. 7 and Fig. 5 of the drawings.

The cabinet in connection with which the connector is particularly adapted to be used, is preferably provided with similar top and bottom panels of relatively thick wood, such as plywood, and as shown at 31 and 18 respectively. The vertical walls adapted to be connected to these bottom walls, and indicated at 12, may be composed of relatively thin plywood or other suitable sheet material, and these walls are suitably strengthened and reinforced by framing or reinforcing strips extending around them adjacent to their marginal edges. In the drawings, one of the vertical frame members for the side wall 12 is shown at 13, while a horizontal frame member is shown at 15.

In fitting the connector in place, the same is placed against the frame members 13 and 15 in a manner to position to end strip 1 flatly against the face of the vertical frame member 13 and to which it is fastened by means of the wood screws 14 and 14a which enter through the holes 8 and 9 in strip 1. The strip section 3 is disposed against the face of the horizontal frame member 15 and it is fastened thereto by the wood screw 16 entering through the hole 7 provided in the strip 3. As will be seen in Fig. 5, the laterally-extended part 4 of the strip 3 takes over the top of the frame member 15.

As will be apparent in Fig. 1, one of the edges of the connector, is formed with spaced teeth 6 and this edge of the connector, including the teeth 6 thereon, enters into groove 17 formed in the bottom 18 or in a top 31 of the cabinet. The depth of the groove 17 is such that when the fastening lug 5 is tightened down toward the surface of the cabinet bottom or top over which it is disposed by rotation of the wing nut 20, the teeth will penetrate slightly in the bottom of the groove 17. The bolt 19, extended through the top or bottom panel of the cabinet will pass through the hole 11 in the lug 5 and the wing nut 20 is applied on the bolt to tighten down the lug 5 against the surface of the top or bottom over which it is arranged.

The connectors are arranged in opposite pairs, one of which is shown in Fig. 1 and its reversely-made duplicate in Fig. 9, one type being applied on one end wall and the other on the opposite end wall.

When it is desired to couple or connect two or more cabinet units together, the units are abutted end-to-end, as shown in Fig. 7 and a long bolt 30 is thereupon extended through the framing strips 13 of the two meeting walls 12 to pass through the two strip sections 1 of the two connectors, as clearly shown in Fig. 8. The wing nut 32 applied to the bolt 30 will act to firmly draw the two cabinet units together and hold them united. By this arrangement, a number of units can be easily joined together.

In addition to the connector described, a supplemental connecting device 21 can also be used when required. This consists of an angle-piece shown in Fig. 6, having a flange 22 adapted to overlie the frame member 15 and having the vertical toothed flange 23 formed with the teeth 24 on one edge. Holes 25 provided in the flange 23 permit of the passage of wood screws 33 for fastening this connector 21 to the frame member 15. The toothed edge of the connector 21 fits into a groove 34 provided in the top or bottom panel of the cabinet.

The dismantling of a cabinet that has its walls united by the connectors described, is simple since it requires merely the removal of the wing nuts 20 and the withdrawal of the bolts 19. If a single unit cabinet is used the bolt 30 need not be employed. Thus, when the wing nuts 20 and bolts 19 are removed the top and bottom of the cabinet may be separated from the side walls, such walls retaining the connectors affixed to them by the wood screws 14, 14a and 16, and if supplemental connectors 21 are used, the wood screws 33. The re-assembly of the cabinet is quickly had by the reinsertion of the bolts and the placing of the wing nuts thereon.

Having described a single embodiment of the invention, it is obvious that the same is not to be restricted thereto, but is broad enough to cover all structures coming within the scope of the annexed claims.

What I claim is:

1. In a display case construction, a pair of walls adapted to be connected together, one of the walls having reinforcing strips along its edges said strips being arranged at right angles to one another, the second wall having a groove located closely adjacent and parallel to one of the strips, a connection member consisting of a plate having a toothed edge entering the groove, said plate having spaced strip portions which facially contact the reinforcing strips on the first wall, means securing the said strip portions to both of the reinforcing strips, one of the strip portions having a laterally-bent end overlying a face of the reinforcing strip to which said strip portion is attached, a laterally-bent lug formed on the plate and located between the strip portions, said lug overlying the grooved wall, and fastening means extending through the lug and entering said grooved wall.

2. In a display case construction, a wall having a vertical reinforcement and a horizontal reinforcement, a case bottom provided with a groove adjacent to one of the reinforcements, a connector consisting of a plate having a strip portion at one end disposed facially against the vertical reinforcement and being flatly secured thereto, said connector having a second strip portion at its opposite end formed with a laterally-bent end, said second strip portion being disposed against and secured to the horizontal reinforcement and having its laterally-bent end taking over a face of said reinforcement, a lug provided on the plate and located between the strip portions thereof, said lug being disposed against the bottom and being fastened thereto, and the plate having an edge located in the groove in the bottom, said edge also constituting an edge of both strip portions.

3. In a display case construction as provided for in claim 2, wherein the groove in the bottom is located adjacent to one edge of said bottom, the edge of the plate entering said groove being toothed and the teeth thereon penetrating below the bottom of the groove.

4. A connector for display case walls comprising a plate having spaced strip portions formed with fastener-receiving openings, one of said strip portions having a laterally-bent end, a lug formed between the strip portions and extending in a direction opposite to the direction of extension of said laterally-bent end, said lug having a fastener-receiving opening, the plate being toothed along one of its edges.

5. A connector for display case walls comprising, a plate toothed along one of its edges, a strip member at each end of the plate, one of the strip members having a laterally-bent end disposed at right angles to the body of the plate, a lug located between the strip members and disposed at right angles to the body of the plate, said lug extending in a direction opposite to the direction of extension of the laterally-bent end, the strip members and the lug being each provided with fastener-receiving openings.

6. A connector for display cabinets comprising, a flat plate split inwardly from one edge to form three strip members, the central strip member constituting a fastening lug and being bent at right angles to the plate and provided with a fastener-receiving opening, one of the remaining strip members being unbent and disposed in the same plane as the body of the plate, the last strip member being bent angularly substantially mid-way of its length, said last-mentioned strip member having its bent portion disposed in a direction opposite to that of the direction of the central strip member, and the plate being toothed along one of its edges.

References Cited in the file of this patent

UNITED STATES PATENTS

| | | |
|---|---|---|
| 875,755 | Wanner | Jan. 7, 1908 |
| 1,346,955 | Gustafson | July 30, 1920 |
| 1,571,601 | Richards | Feb. 2, 1926 |
| 2,302,439 | Greitzer | Nov. 17, 1942 |
| 2,700,584 | Hobbs | Jan. 25, 1955 |

FOREIGN PATENTS

| | | |
|---|---|---|
| 457,188 | France | Sept. 13, 1913 |